United States Patent
Katogi et al.

[11] Patent Number: 6,083,131
[45] Date of Patent: *Jul. 4, 2000

[54] HYDRAULIC AUTOTENSIONER

[75] Inventors: Sadaji Katogi; Yoshikazu Hida, both of Shizuoka, Japan

[73] Assignee: NTN Corporation, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/977,238

[22] Filed: Nov. 24, 1997

[30] Foreign Application Priority Data

Nov. 25, 1996 [JP] Japan ................................ 8-313665
Nov. 25, 1996 [JP] Japan ................................ 8-313679
Nov. 25, 1996 [JP] Japan ................................ 8-313788

[51] Int. Cl.[7] ........................... F16H 7/08; F16H 7/12
[52] U.S. Cl. ........................ 474/110; 474/112; 474/113
[58] Field of Search ................... 474/110, 109, 474/101, 135, 112, 80; 418/171; 137/296; 384/569; 411/910, 352, 353, 999, 970, 517, 518

[56] References Cited

U.S. PATENT DOCUMENTS

| 4,557,707 | 12/1985 | Thomey | 474/135 X |
| 4,904,230 | 2/1990 | Kawashima et al. | 474/112 |
| 4,917,655 | 4/1990 | Martin | 474/112 |
| 5,011,460 | 4/1991 | Ouchi et al. | 474/135 X |
| 5,230,275 | 7/1993 | Hodge et al. | 384/569 |
| 5,548,982 | 8/1996 | Rawling | 411/910 |
| 5,607,368 | 3/1997 | Hida et al. | 474/135 X |
| 5,702,317 | 12/1997 | Kawashima et al. | 474/112 X |
| 5,836,844 | 11/1998 | Yoshida | 474/80 |

Primary Examiner—Thomas R. Hannon
Assistant Examiner—Marcus Charles
Attorney, Agent, or Firm—Wenderoth, Lind & Ponack, L.L.P.

[57] ABSTRACT

A hydraulic autotensioner for keeping constant the tension in a belt. It has a bolt threadedly fixed to a stationary member, an eccentric ring supported by the bolt at an off-center position so as to be pivotable about the bolt, a pulley rotatably mounted on the eccentric ring, and a tension adjusting spring for biasing the eccentric ring in such a direction that the belt is pressed by the pulley. A hydraulic damper having a damper body is mounted between the stationary member and the eccentric ring so as to abut the eccentric ring for damping the pushing force applied to the eccentric ring from the belt through the pulley. A coupling ring is provided to keep the eccentric ring and the hydraulic damper coupled together.

13 Claims, 8 Drawing Sheets

HYDRAULIC AUTOTENSIONER

BACKGROUND OF THE INVENTION

This invention relates to a hydraulic autotensioner for keeping constant the tension in a timing belt mounted in an automotive internal combustion engine.

Figure 8A:
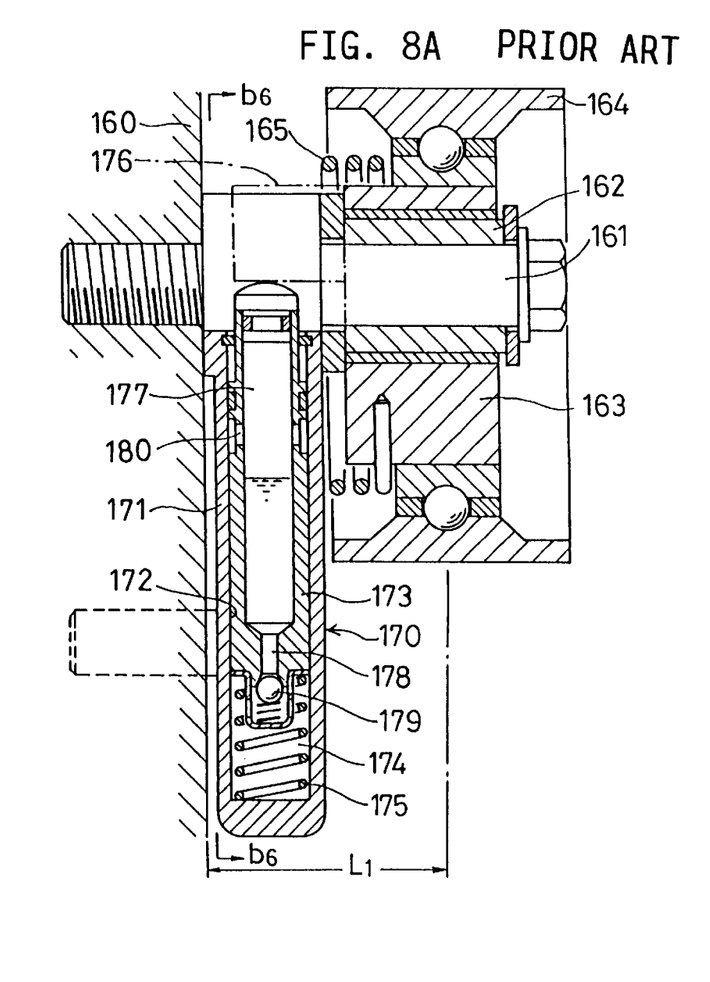
FIG. 8A is a vertical sectional view of a conventional autotensioner.
Figure 8B:
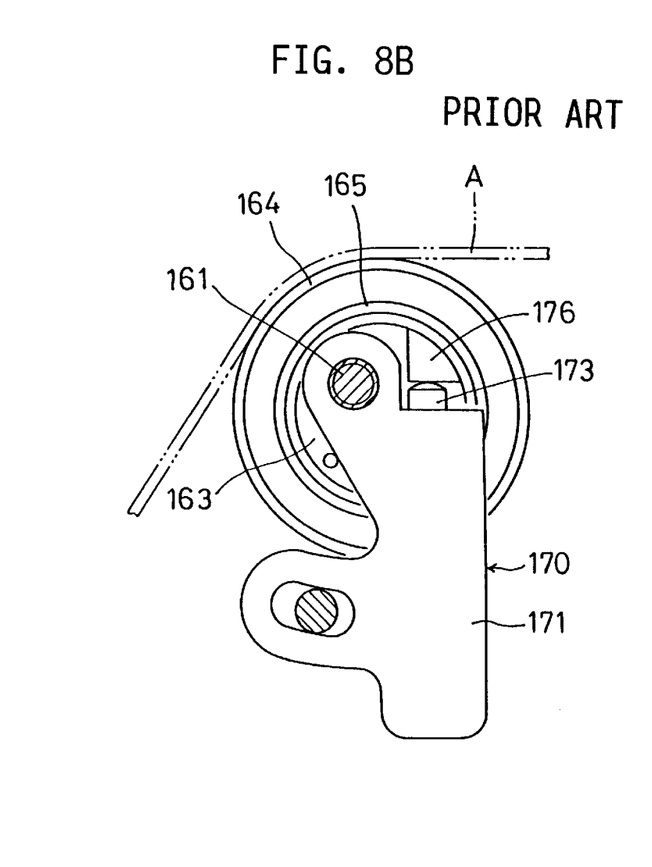
FIG. 8B is a section taken along line b6—b6 of FIG. 8A.

The applicant of this invention proposed an autotensioner of this type as shown in FIGS. 8A, 8B.

This autotensioner comprises a tubular pivot shaft 162 fixed in position by tightening a bolt 161 into an engine block 160, an eccentric ring 163 supported on the pivot shaft 162 at its off-center point, a pulley 164 rotatably supported on the eccentric ring 163, and a tension adjusting spring 165 supported on the pivot shaft 162 for imparting a turning force to the eccentric ring 163 to press the pulley 164 against a belt A.

A hydraulic damper 170 is provided between the engine block 160 and the pulley 164. The damper 170 damps the force applied to the eccentric ring 163 when the ring is pushed by the tensioning belt A through the pulley 164.

The hydraulic damper 170 includes a damper body 171 fixed to the engine block 160 by tightening the bolt 161 and formed with an open-topped cylinder chamber 172 in which is slidably mounted a plunger 173 having at its lower portion a pressure chamber 174 in which is mounted a return spring 175 biasing the plunger 173 to press its tip against a protrusion 176 provided on the eccentric ring 163.

The plunger 173 is formed with a reservoir chamber 177 and a passage 178 through which the reservoir chamber 177 communicates with the pressure chamber 174. A check valve 179 is provided near the bottom end of the passage 178.

When the tension in the belt A increases, the eccentric ring 163 is pushed by the belt A through the pulley 164. This pushing force is damped by hydraulic oil sealed in the pressure chamber 174 of the hydraulic damper 170. While the pushing force is greater than the force of the return spring 175 and the tension adjusting spring 165, hydraulic oil in the pressure chamber 174 is allowed to flow into the reservoir chamber 177 through a gap between the sliding surfaces of the plunger 173 and the cylinder chamber 172 and a radial passage 180 formed in the plunger 173, so that the plunger 173 retracts slowly until the pushing force balances with the force of the return spring 175 and the tension adjusting spring 165.

When the belt A slackens and the eccentric ring 163 pivots under the force of the tension adjusting spring 165, the plunger 173 is pushed upward under the force of the return spring 175. As a result, the pressure in the pressure chamber 174 drops below the pressure in the reservoir chamber 177, so that the passage 178 is opened by the check valve 179. Hydraulic oil in the reservoir chamber 177 thus flows smoothly into the pressure chamber 174 through the passage 178, thus allowing the plunger 173 to move quickly upwardly.

The pulley 164 can thus quickly and smoothly move following change in the belt tension when the belt stretches or slackens.

With this type of hydraulic autotensioner, the eccentric ring 163 is coupled to the hydraulic damper 170 by inserting the bolt 161 extending through the eccentric ring 163 into a bolt hole 181 formed in the damper body 171 and then threading the bolt 163 into the engine block 160. Thus, before the hydraulic autotensioner is mounted on the engine block 160 or after it has been dismounted from the engine block, the eccentric ring 163 might separate from the hydraulic damper 170. This makes it difficult to mount the damper.

An object of this invention is to provide an autotensioner which can prevent separation of its eccentric ring from the hydraulic damper and thus can be mounted easily.

SUMMARY OF THE INVENTION

According to this invention, there is provided a hydraulic autotensioner for keeping constant the tension in a belt, comprising a bolt which is threadedly fixed to a stationary member, an eccentric ring supported at an off-center position by the bolt so as to be pivotable about the bolt, a pulley rotatably mounted on the eccentric ring, a tension adjusting spring for biasing the eccentric ring in such a direction that the belt is pressed by the pulley, a hydraulic damper having a damper body and mounted between the stationary member and the eccentric ring for damping the pushing force applied to the eccentric ring from the belt through the pulley, and a coupling means for keeping the eccentric ring and the hydraulic damper coupled together.

The coupling means may comprise a groove formed in the tip of the bolt extending through the damper body of the hydraulic damper, and a retaining ring engaged in the groove.

Alternatively, the coupling means may comprise an arcuate elongated hole formed in the eccentric ring so as to have its center disposed at the bolt, a pin provided on the damper body of the hydraulic damper and inserted in the elongated hole, and a flanged cap member press-fitted on the tip of the pin so as to be movable in and along the elongated hole.

The coupling means may otherwise comprise a flanged sleeve disposed between the bolt and the bolt hole formed in the eccentric ring, and a sleeve inserting hole formed in the damper body of the hydraulic damper to receive the tip of the flanged sleeve.

In order to increase the durability of the hydraulic autotensioner, a thrust washer may be mounted between the head of the bolt and the eccentric ring to prevent wear of the opposite surfaces between the bolt head and the eccentric ring.

The eccentric ring of the hydraulic autotensioner according to the present invention may be formed by turning. But this method is time-consuming and incurs high cost. Thus the eccentric ring should preferably be formed of a sintered body.

Other features and objects of the present invention will become apparent from the following description made with reference to the accompanying drawings, in which:

DETAILED DESCRIPTION OF THE PREFERRED EMBODIMENT

With reference to the drawings, various embodiments shall be described in which the same or similar parts are denoted by the same numbers.

First Embodiment

Figure 1A:
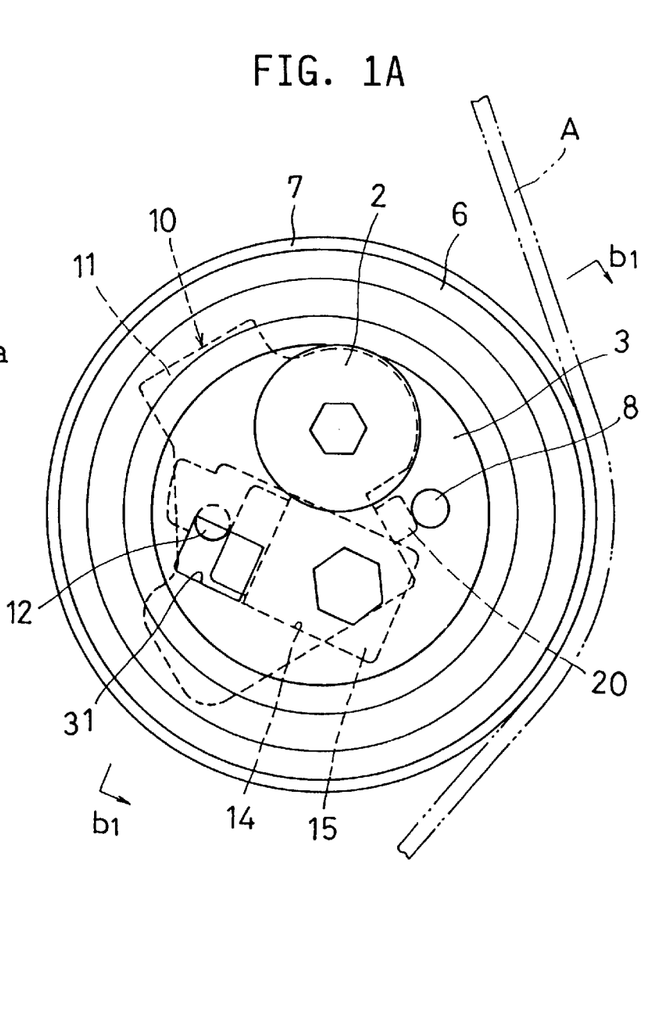
FIG. 1A is a front view of the first embodiment of a hydraulic autotensioner according to this invention.
Figure 1B:
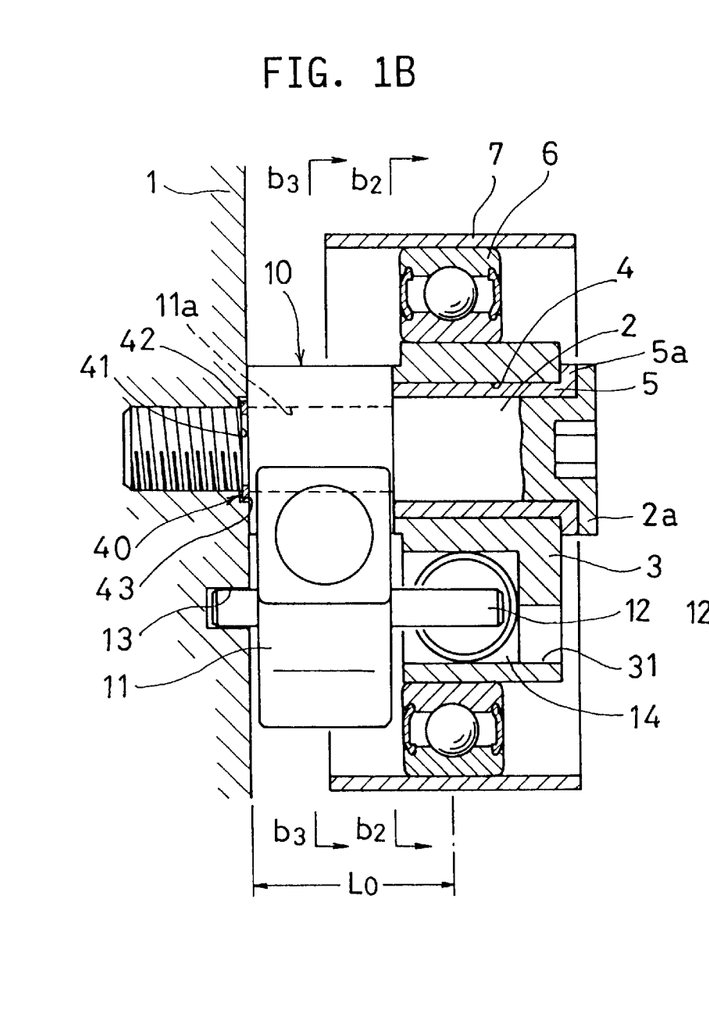
FIG. 1B is a sectional view taken along line b1—b1 of FIG. 1A.
Figure 2A:
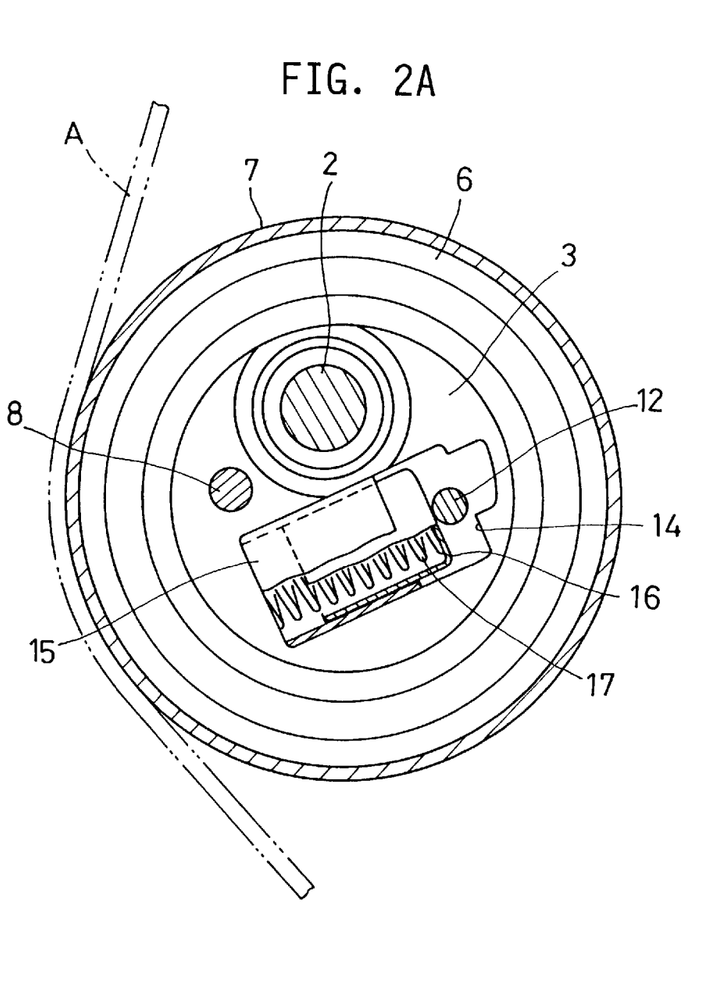
FIG. 2A is a sectional view taken along line b2—b2 of FIG. 1B.
Figure 2B:
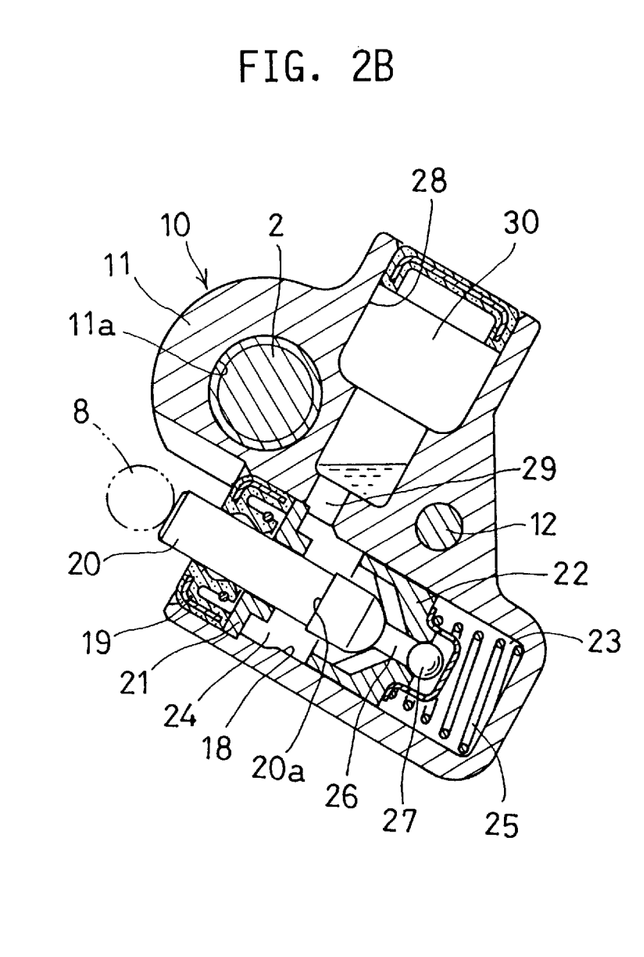
FIG. 2B is a sectional view taken along line b3—b3 of FIG. 1B.

FIGS. 1 and 2 show the first embodiment of this invention. As shown, a headed bolt 2 to be threaded into a stationary member or an engine block 1 is inserted in a bolt hole 4 formed in an eccentric ring 3 at its off-center position. A slide bearing 5 is mounted in the hole 4 between the eccentric ring 3 and the bolt 2 to support the eccentric ring 3 pivotally.

The slide bearing 5 has a flange 5a disposed between the head 2a of the bolt 2 and the eccentric ring 3 to prevent wear of the opposite surfaces between them. But instead of the flange 5a, a thrust washer may be mounted between the head of the bolt 2 and the eccentric ring 3.

The eccentric ring 3 may be formed by cutting. But in view of cost, it is formed of a sintered body in this invention. A rolling bearing 6 is mounted on the eccentric ring 3 and the pulley 7 is rotatably supported by the rolling bearing 6.

Mounted between the engine block 1 and the eccentric ring 3 is a hydraulic damper 10 which has a damper body 11 that is sized and positioned such that it will never protrude from the inner-diameter circle of the pulley 7 (i.e. the hydraulic damper 10 is fully disposed inside of an outer periphery of the pulley 7, and illustrated in FIG. 1A). The bolt 2 is inserted through a bolt hole 11a formed in the damper body 11. By tightening the bolt 2, the damper body 11 is fixed in position.

An engaging pin 12 extending through the damper body 11, is engageable at one end thereof in a pin hole 13 formed in the engine block 1 to hold the damper body 11 nonrotatable.

The other end of the engaging pin 12 protrudes into a recess 14 formed in the eccentric ring 3. Mounted in the recess 14 is a guide cylinder 15 made of synthetic resin in which is slidably mounted a tubular cap 16. The cap is pressed against the engaging pin 12 by a tension adjusting spring 17 mounted in the guide cylinder 15. The eccentric ring 3 is thus biased by the tension adjusting spring 17 in a direction to press the pulley 7 against the belt A.

As shown in FIG. 2B, an obliquely extending cylinder chamber 18 is formed in the damper body 11 at its lower portion. The cylinder chamber 18 has its top opening sealed by an oil seal 19 through which a rod 20 slidably extends. The rod 20 is slidably supported by a wear ring 21 axially unmovably mounted in the cylinder chamber 18. The rod 20 has a shoulder 20a on its outer periphery near the bottom end to prevent the rod 20 from coming out of the cylinder chamber 18 during transportation of this hydraulic autotensioner by abutment of the shoulder 20a on the wear ring 21.

Provided under the rod 20 is a plunger 22 so as to be slidable along the inner surface of the cylinder chamber 18. The plunger 22 defines a pressure chamber 23 and a main reservoir 24 in the cylinder chamber 18. A return spring 25 is mounted in the pressure chamber 23 to bias the rod 20 outwardly of the cylinder chamber 18 through the plunger 22. The protruding end of the rod 20 is thus pressed against a pin 8 provided on the eccentric ring 3.

The plunger 22 has a passage 26 through which the pressure chamber 23 communicates with the main reservoir 24. A check valve 27 provided at the bottom end of the passage 26 closes the passage 26 whenever the pressure in the pressure chamber 23 is higher than the pressure in the main reservoir 24.

The damper body 11 is further formed with a sub-reservoir 28 located above the main reservoir 24 and communicating with the reservoir 24 through a passage 29.

The pressure chamber 23, main reservoir 24 and sub-reservoir 28 are filled with hydraulic oil. The sub-reservoir 28 has an air space 30 above hydraulic oil.

The eccentric ring 3 and the hydraulic damper 10 are assembled together by a coupling means 40 which comprises, as shown in FIG. 1B, a groove 41 formed in the outer periphery of the bolt 2 at its portion protruding from the bolt hole 11a of the damper body 11, and a retaining ring 42 engaged in the groove 41 to keep the bolt 2 from coming out of the hole 11a, thus preventing separation of the eccentric ring 3 from the hydraulic damper 10.

Figure 3A:
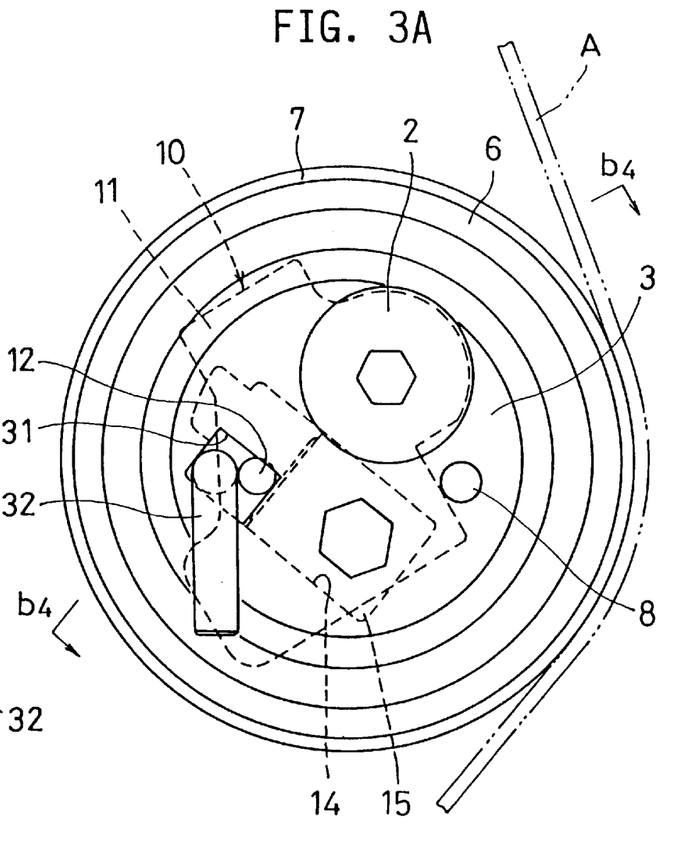
FIG. 3A is a front view of the hydraulic autotensioner of FIG. 1 before being mounted in position.
Figure 3B:
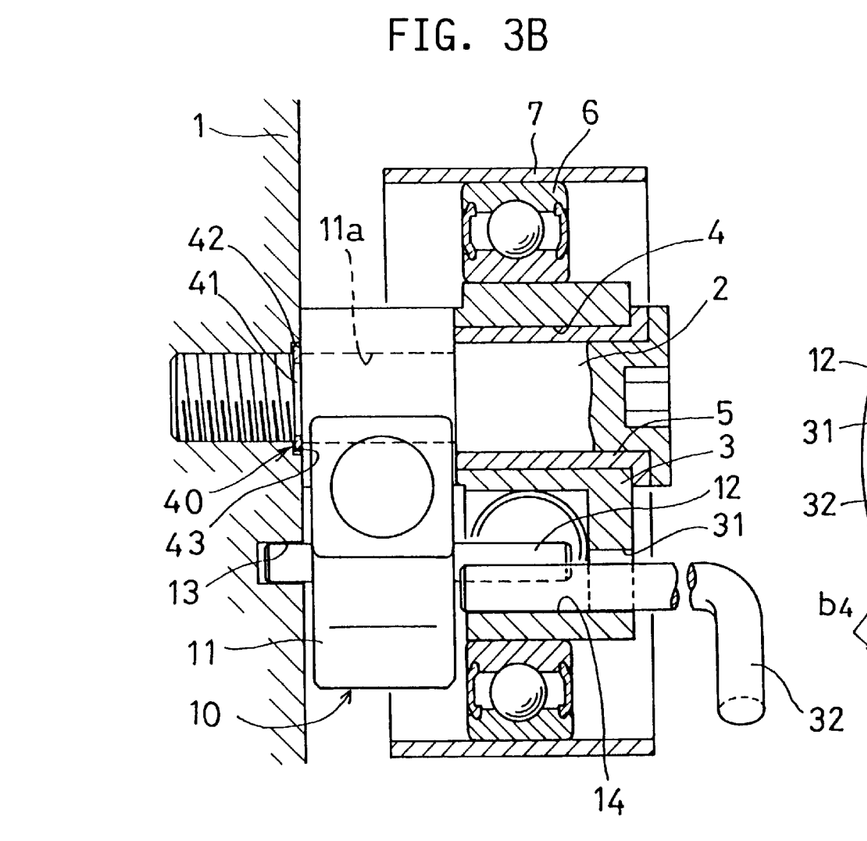
FIG. 3B is a sectional view taken along line b4—b4 of FIG. 3A.

FIGS. 3A and 3B show the hydraulic autotensioner before being mounted in position. In this state, a set pin 32 is inserted into a pin hole 31 extending from the surface of the eccentric ring 3 to the recess 14 to keep the tension adjusting spring 17 shown in FIG. 2A and the return spring 25 shown in FIG. 2B in a compressed state.

To insert the set pin 32, the eccentric ring 3 and the hydraulic damper 10 are pivoted relative to each other about the bolt 2 in such a direction that the rod 20 of the hydraulic damper 10 is pushed in by the pin 8 to push in the cap 16 shown in FIG. 2A with the pin 12 and thus to compress the tension adjusting spring 17. In this state, the set pin 32 is inserted into the pin hole 31 formed in the eccentric ring 3 to bring the set pin 32 into engagement with the pin 12.

With the set pin 32 engaging the pin 12, the eccentric ring 3 and the hydraulic damper 10 are held in the relatively pivoted position, so that the tension adjusting spring 17 and the return spring 25 are kept compressed.

The set pin 32 is pulled out after the hydraulic autotensioner has been mounted in position by threading the bolt 2 into the engine block 1.

When the set pin 32 is pulled out, the eccentric ring 3 is pivoted in such a direction as to stretch the belt A under the force of the tension adjusting spring 17, thus pressing the belt A with the pulley 7 at a constant pressure as shown in FIG. 1A. Meanwhile, the plunger 22 and the rod 20 are moved outwardly by the return spring 25. They will stop when the rod pushing force applied from the belt A to the rod 20 through the pin 8 balances with the force of the return spring 25 and the tension adjusting spring 17.

Since the tension adjusting spring 17 and the return spring 25 are kept compressed by the set pin 32, there is no need to pivot the pulley 7 away from the belt when the hydraulic autotensioner is mounted. It can thus be mounted easily.

FIGS. 1A and 1B show the hydraulic autotensioner as mounted in position. In this state, the tension in the belt A changes with changing turning torque. When the belt A slackens, the eccentric ring 3 is pivoted quickly about the bolt 2 under the force of the tension adjusting spring 17 in a direction to stretch the belt A. The belt is thus re-stretched quickly.

As the eccentric ring 3 pivots, the pin 8 moves in a direction away from the top end of the rod 20, so that the plunger 22 and the rod 20 are pushed out by the return spring 25. When the plunger 22 begins moving outward, the pressure in the pressure chamber 23 drops below the pressure in the main reservoir 24. The passage 26 is thus opened by the check valve 27, so that fluid smoothly flows into the pressure chamber 23 from the main reservoir 24 through the passage 26.

This permits quick outward movement of the plunger 22 and the rod 20 until the tip of the rod 20 touches the pin 8.

When the tension in the belt A increases and the eccentric ring 3 is pivoted by the belt A through the pulley 7, the rod 20 is pushed in by the pin 8 of the eccentric ring 3.

In this state, the pressure in the pressure chamber 23 is higher than the pressure in the main reservoir 24. The check valve 27 thus closes the passage 26, so that the pushing force applied to the eccentric ring 3 is borne by the hydraulic oil sealed in the pressure chamber 23 and the tension adjusting spring 17. The belt A is thus kept tensioned.

When the rod 20 is pushed by the belt with a force greater than the force of the return spring 25 as a result of increased tension in the belt A, hydraulic oil in the pressure chamber 23 flows into the main reservoir 24 through a gap between the inner wall of the cylinder chamber 18 and the plunger 22. Thus, the rod 20 and the plunger 22 are slowly pushed in until the push-in force balances with the force of the return spring 25 and the tension adjusting spring 17.

In the arrangement of FIGS. 1A and B and 3A and B, the retaining ring 42 engaged in the groove 41 formed in the bolt 2 prevents separation of the eccentric ring 3 from the hydraulic damper 10 before the autotensioner is mounted in position such as during transportation. The hydraulic autotensioner can thus be mounted easily.

Figure 4A:
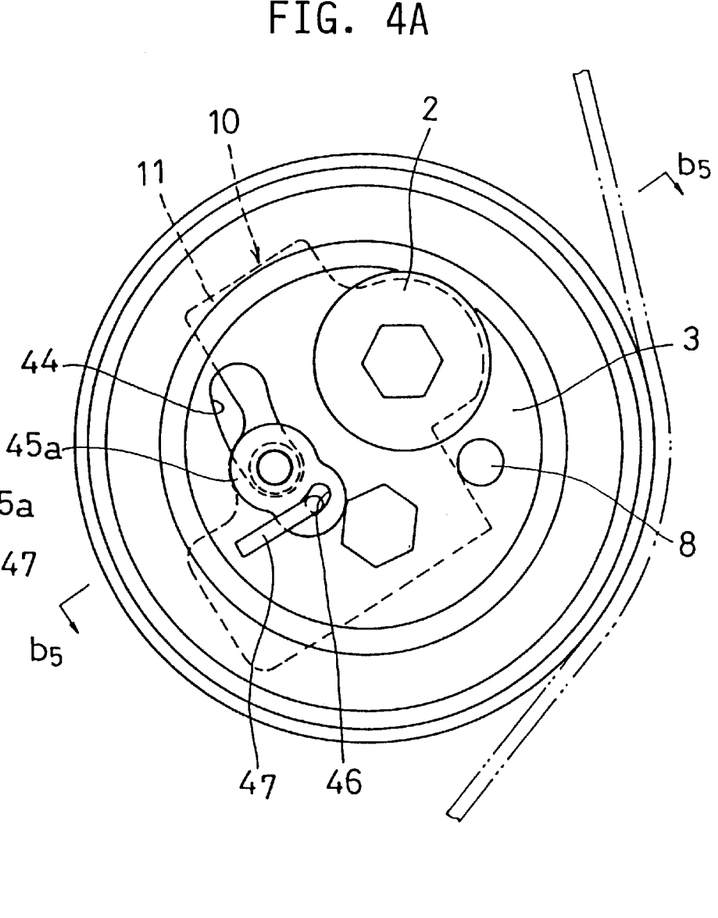
FIG. 4A is a front view of a different example of the coupling means in the hydraulic autotensioner of FIG. 1A.
Figure 4B:
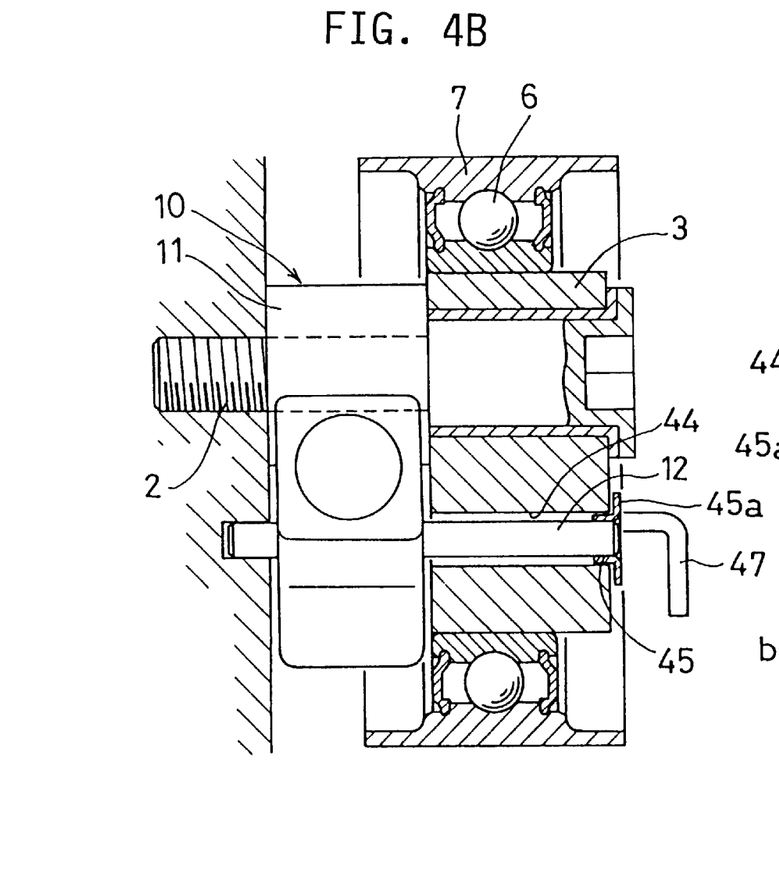
FIG. 4B is a sectional view taken along line b5—b5 of FIG. 4A.
Figure 5:
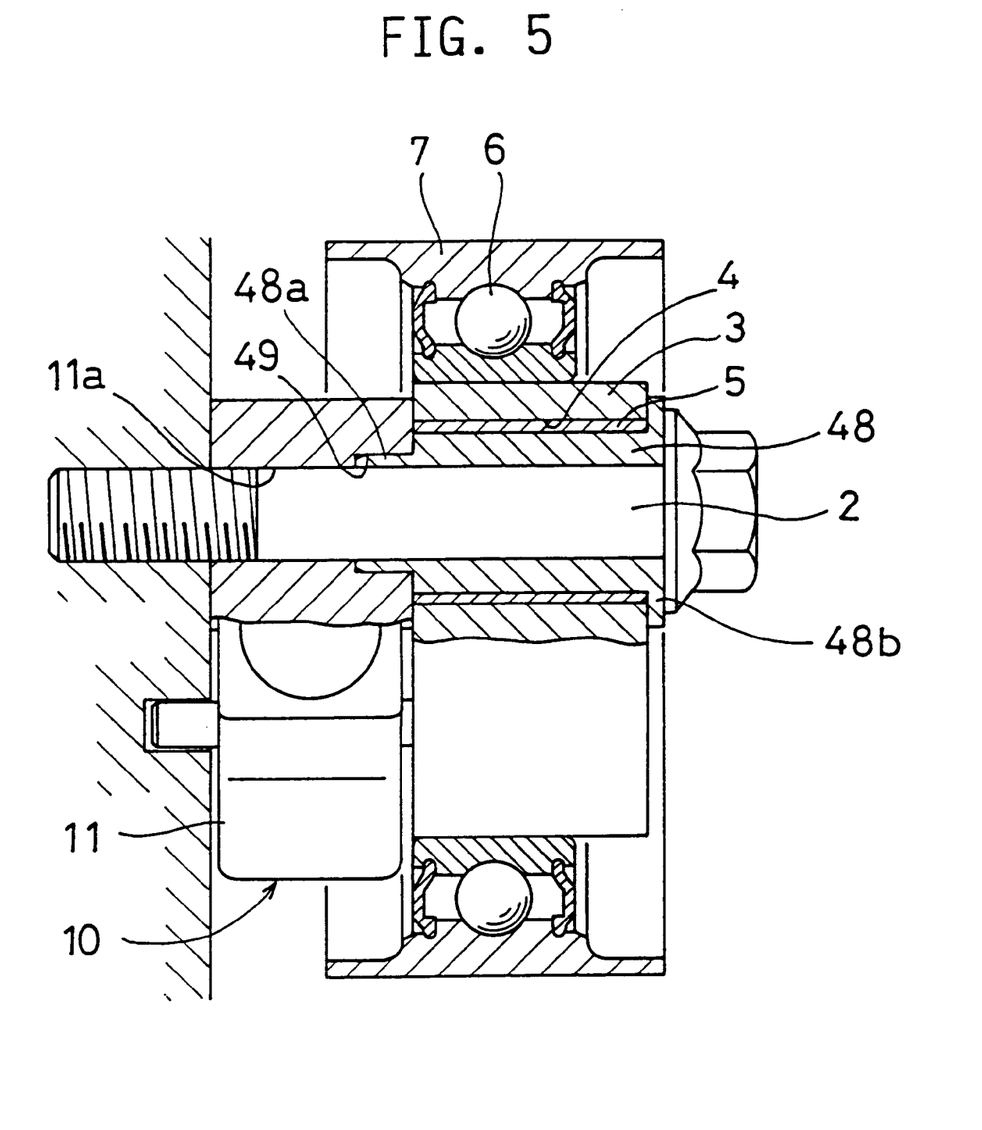
FIG. 5 is a side view in vertical section of a still different type of coupling means of the same hydraulic autotensioner.

FIGS. 4 and 5 show a different coupling means 40 for keeping the eccentric ring 3 and the hydraulic damper 10 coupled together.

The coupling means shown in FIGS. 4A and 4B comprises an arcuate elongated hole 44 formed in the eccentric ring 3 so as to form a part of a circle having its center at the bolt ?, and a pin 12 provided on the damper body 11 of the hydraulic damper 10 and engaged in the hole 44. The pin 12 has a flanged cap 45 press-fitted on its tip so as to be movable along the hole 44. The cap 45 has a flange 45a opposite the front surface of the eccentric ring 3, holding the eccentric ring 3 and the hydraulic damper 10 coupled together.

In the embodiment of FIGS. 4A and 4B, a pin hole 46 is formed in the flange 45a of the cap 45 in alignment with an unillustrated pin hole formed in the eccentric ring 3. A set pin 47 is inserted into these aligned pin holes to hold the tension adjusting spring 17 and the return spring 25 shown in FIG. 2 in a compressed state, in the same manner as shown in FIGS. 3A and 3B.

The coupling means shown in FIG. 5 comprises a flanged sleeve 48 disposed between the bolt 2 and the slide bearing 5 and having at its tip a small-diameter portion 48a press-fitted in a hole 49 formed in the damper body 11 of the hydraulic damper 10. The flange 48b of the sleeve 48 is provided opposite the front surface of the eccentric ring 3, holding the eccentric ring 3 and the hydraulic damper 10 coupled together.

Figure 6A:
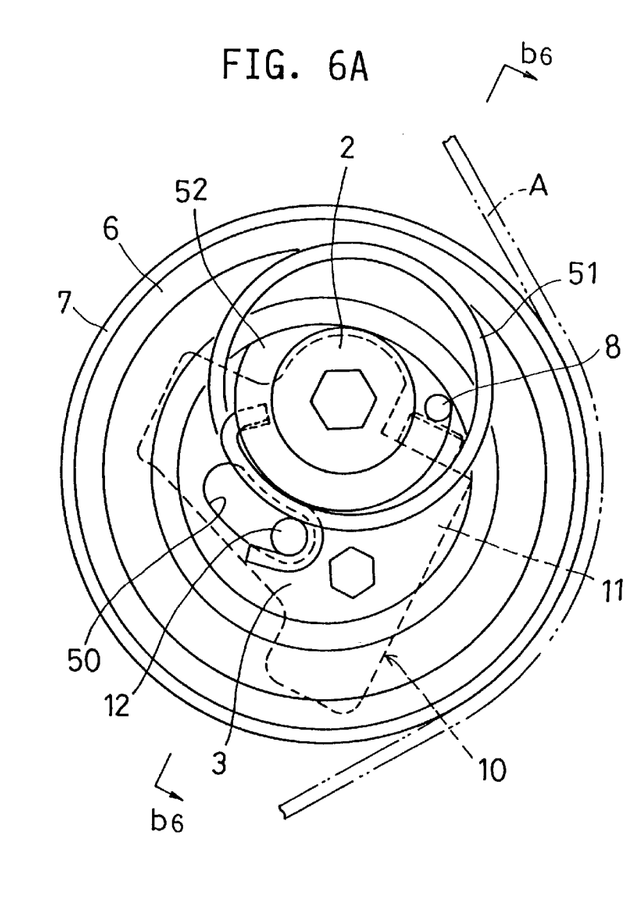
FIG. 6A is a front view of the second embodiment of the hydraulic autotensioner of the invention.
Figure 6B:
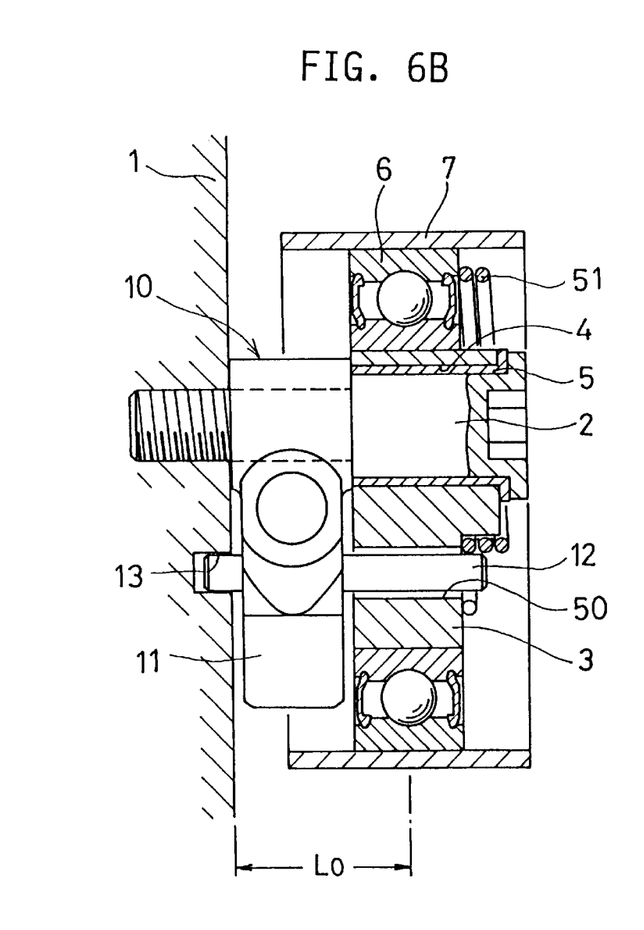
FIG. 6B is a sectional view taken along line b6—b6 of FIG. 6A.

Either of the coupling means shown in FIGS. 4A and B and 5 can keep the eccentric ring 3 and the hydraulic damper 10 coupled together, and thus makes it possible to mount the hydraulic autotensioner more easily.
Second Embodiment FIGS. 6A and 6B show another embodiment of the hydraulic autotensioner according to this invention. Similar to the embodiment of FIGS. 4A and B, this embodiment has an arcuate elongated hole 50 formed in the eccentric ring 3 and having its center at the bolt 2, and a pin 12 provided on the damper body 11 and having its tip engaged in the hole 50.

On the front side of the eccentric ring 3, a tension adjusting spring 51 in the form of a torsion spring is mounted so as to be within the inner-diameter circle of the pulley 7. The tension adjusting spring 51 has one end thereof engaging the pin 12 and the other end in engagement with a protrusion 52 formed on the front surface of the eccentric ring 3 to bias the ring 3 in a direction to stretch the belt A.

This embodiment is otherwise structurally no different from the embodiment of FIGS. 1A and B and 2A and B. Thus, the elements shown in FIGS. 1A and B and 2A and B are denoted by the same numerals and their description is omitted.

As in the embodiment of FIGS. 4A and B, the hydraulic autotensioner shown in FIGS. 6A and B has a flanged cap 45 press-fitted on the tip (other end) of the pin 12 to hold the eccentric ring 3 and the hydraulic damper 10 coupled together.

The hydraulic autotensioners shown in FIGS. 1A to 6B have a sub-reservoir 28 formed in the damper body 11 of the hydraulic damper 10 so as to communicate with the main reservoir 24. This makes it possible to reduce the size of the damper body 11 and thus to arrange the entire cylinder 11 within the inner-diameter circle of the pulley 7. This leads to a reduced size of the entire hydraulic autotensioner. That is, with this arrangement, the distance L0 from the engine block 1 to the center of the pulley 7 is smaller than in the arrangement of FIGS. 8A and 8B.

Figure 7:
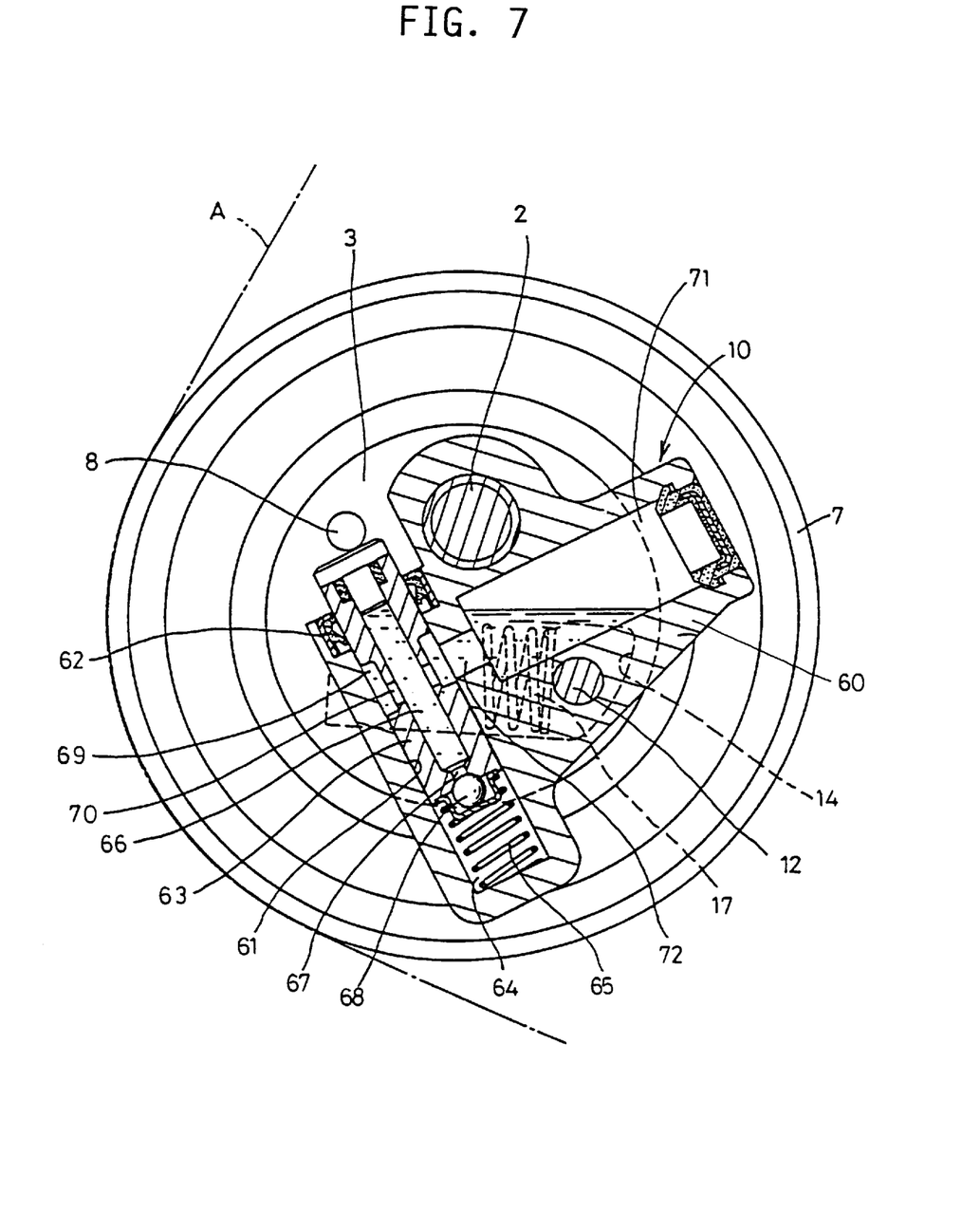
FIG. 7 is a sectional view of another example of the hydraulic damper.

FIG. 7 shows another example of the hydraulic damper 10. The latter comprises a cylinder chamber 61 formed at one side of a damper body 60, an oil seal 62 mounted at the opening of the cylinder chamber 61, a plunger 63 slidably mounted to extend through the oil seal 62, a pressure chamber 64 defined under the plunger 63, and a return spring 65 mounted in the pressure chamber 64 to bias the plunger 63 outwardly.

The plunger 63 is formed with a main reservoir chamber 66 and a passage 67 through which the main reservoir chamber 66 communicates with the pressure chamber 64. A check valve 68 is provided in the passage 67 to close it when the pressure in the pressure chamber 64 becomes higher than the pressure in the main reservoir chamber 66.

The plunger 63 is also formed with an annular groove 69 and a radial hole 70 through which the annular groove 69 communicates with the main reservoir chamber 66. On the other hand, the damper body 60 has a sub-reservoir chamber 71 disposed at one side of the cylinder chamber 61, and a passage 72 through which the sub-reservoir chamber 71 communicates with the annular groove 69. This arrangement allows hydraulic oil to flow between the main reservoir chamber 66 and the sub-reservoir chamber 71.

In this hydraulic damper 10, too, by providing the sub-reservoir chamber 71 in addition to the main reservoir chamber 66, the hydraulic damper 10 can be compact and can be mounted within the inner diameter circle of the pulley 7.

In the first and second embodiments, the eccentric ring and the hydraulic damper are coupled together by the coupling means, so that the hydraulic autotensioner can be easily mounted in position.

What is claimed is:

1. A hydraulic autotensioner for keeping constant the tension in a belt, comprising a bolt to be threadedly fixed to a stationary member, an eccentric ring supported by said bolt at an off-center position so as to be pivotable about said bolt, a pulley rotatable mounted on said eccentric ring, a tension adjusting spring for biasing said eccentric ring in such a direction that the belt is pressed by said pulley, a hydraulic damper having a damper body and mounted to be disposed between the stationary member and said eccentric ring so as to abut said eccentric ring for damping the pushing force applied to said eccentric ring from the belt through said pulley, and a coupling means for keeping said eccentric ring and said hydraulic damper coupled together, wherein said hydraulic damper is fully disposed inside of an outer periphery of said pulley, and wherein said coupling means comprises a hole formed in said eccentric ring, a pin provided on said damper body of said hydraulic damper and inserted in said hole, and a flanged cap member press-fitted on a tip of said pin, said flanged cap member having a longitudinal part extending longitudinally of said pin and a flange extending radially outwardly from said longitudinal part, wherein said eccentric ring is held between said flange of said flanged cap member and said damper body of said hydraulic damper so as to maintain said eccentric ring and said hydraulic damper coupled together.

2. A hydraulic autotensioner as claimed in claim 1 wherein a thrust washer is mounted between the head of said bolt and said eccentric ring.

3. A hydraulic autotensioner as claimed in claim 1 wherein said eccentric ring is formed of a sintered body.

4. A hydraulic autotensioner as claimed in claim 1, wherein said hole formed in said eccentric ring has a transverse cross-sectional shape which is arcuately elongated so as to have a center of curvature at said bolt, and wherein said flanged cap member press-fitted on the tip of said pin is movable in said hole along an arc defined by the arcuately elongated transverse cross-sectional shape of said hole.

5. A hydraulic autotensioner as claimed in claim 1, wherein said hydraulic damper comprises a damper body having formed therein a cylinder chamber and a sub-reservoir separated from but fluidically communicating with said cylinder chamber.

6. A hydraulic autotensioner as claimed in claim 5, wherein said sub-reservoir is disposed radially from said cylinder chamber.

7. A hydraulic autotensioner as claimed in claim 5, wherein said cylinder chamber has an axially movable plunger therein separating said cylinder chamber into a pressure chamber and a main reservoir, said sub-reservoir opening into said main reservoir.

8. A hydraulic autotensioner for keeping constant the tension in a belt, comprising a bolt to be threadedly fixed to a stationary member, an eccentric ring supported by said bolt at an off-center position so as to be pivotable about said bolt, a pulley rotatably mounted on said eccentric ring, a tension adjusting spring for biasing said eccentric ring in such a direction that the belt is pressed by said pulley, a hydraulic damper having a damper body and mounted to be disposed between the stationary member and said eccentric ring so as to abut said eccentric ring for damping the pushing force applied to said eccentric ring from the belt through said pulley, and a coupling means for keeping said eccentric ring and said hydraulic damper coupled together, wherein said hydraulic damper is fully disposed inside of an outer periphery of said pulley, and wherein said coupling means comprises a hole formed in said eccentric ring and having a transverse cross-sectional shape which is arcuately elongated so as to have a center of curvature disposed at said bolt, a pin provided on said damper body of said hydraulic damper and inserted in said hole, and a flanged cap member press-fitted on a tip of said pin so as to be movable in said hole along an arc defined by the arcuately elongated transverse cross-sectional shape of said hole.

9. A hydraulic autotensioner as claimed in claim 8 wherein a thrust washer is mounted between the head of said bolt and said eccentric ring.

10. A hydraulic autotensioner as claimed in 8 wherein said eccentric ring is formed of a sintered body.

11. A hydraulic autotensioner as claimed in claim 8, wherein said hydraulic damper comprises a damper body having formed therein a cylinder chamber and a sub-reservoir separated from but fluidically communicating with said cylinder chamber.

12. A hydraulic autotensioner as claimed in claim 11, wherein said sub-reservoir is disposed radially from said cylinder chamber.

13. A hydraulic autotensioner as claimed in claim 11, wherein said cylinder chamber has an axially movable plunger therein separating said cylinder chamber into a pressure chamber and a main reservoir, said sub-reservoir opening into said main reservoir.

* * * * *